Feb. 4, 1964

J. S. LUKESH ETAL 3,120,658

TAKE-OFF MONITOR SYSTEM

Filed May 8, 1959

INVENTORS:
John S. Lukesh
David E. Ruch
Max R. Stanley

By Willard M. Graham
Agent

United States Patent Office 3,120,658
Patented Feb. 4, 1964

3,120,658
TAKE-OFF MONITOR SYSTEM
John S. Lukesh, Inglewood, David E. Ruch, Playa Del Rey, and Max R. Stanley, Los Angeles, Calif., assignors to Northrop Corporation, Beverly Hills, Calif., a corporation of California
Filed May 8, 1959, Ser. No. 812,015
15 Claims. (Cl. 343—7)

The present invention relates to aircraft safety, and more particularly, to a ground-based take-off capability measuring system for aircraft.

Due to the variable performance of turbo-jet aircraft, a serious take-off problem now exists. Even when the pilot has checked, to his satisfaction, the engine speed, tailpipe temperature, pressure ratio, and exhaust nozzle position during the ground roll, he is still not absolutely assured of a successful take-off, because of such other factors as aircraft weight, variable air temperature and pressure effects on engine thrust, or dragging brakes, for example. Thus, it is a complex problem requiring a relatively large magnitude of input data to be obtained and processed.

One of the present standard means by which a pilot may check his take-off capability during the take-off ground roll is the line speed check method. This method aids the pilot, but has definite limitations, some of which are more peculiar to turbo-jet engine aircraft than to piston engine aircraft. No better solution to the problem has been adopted in actual practice, although several systems have been suggested. However, the present invention is believed to be a completely satisfactory solution from all aspects and usable for all aircraft except vertically rising craft.

In order to accurately predict take-off performance, optimum measurement and use of the following variables is required: aircraft acceleration, aircraft ground speed, position of the aircraft on the runway, wind velocity parallel with the runway, atmospheric pressure and temperature, and the true airspeed required for take-off. Any system which does not take into account all these factors or which gives an inaccurate value for any of them, will be unsatisfactory.

Probably the most important factor in the above list, and the one presenting the greatest problem for a practical system, is the aircraft acceleration. An aircraft-mounted accelerometer will sense gravitational acceleration as well as aircraft acceleration, and therefore the attitude of the accelerometer with respect to gravity must be precisely known. To obtain a usable accuracy, acceleration must be known correctly within .002 g., which corresponds to an allowable uncertainty in accelerometer attitude of .12 degree. To obtain attitude stability of this order of accuracy, the accelerometer must be mounted on a stabilized level platform, with the associated penalty of increased cost and weight, and decreased reliability.

If continuous aircraft position on the runway is to be determined by double integration of the acceleration, it is easily seen how any error in original measurement will be compounded, by the time take-off point is reached.

The overall objective of the present invention is to provide a take-off monitor system which will give the pilot an accurate and continuous GO or NO GO signal during the take-off run, indicating simply whether or not the aircraft will reach flying speed before the end of the runway is reached, if the instantaneous performance continues, and to accomplish this without adding to the aircraft weight.

An additional object is to provide a system operable in two sequential modes, wherein in the first mode, during the first portion of the monitored take-off run, a NO GO signal is given if aircraft performance drops below the known normal for the given situation, and while a safe stop or aborted take-off can still be made; and wherein in the second mode, during the remainder of the monitored take-off run, the NO GO signal is given only if the aircraft performance drops far enough below normal so that flying speed will not be reached before the end of the runway.

A further object is to indicate to the pilot when take-off airspeed has been attained.

It is a further object of this invention to provide a take-off monitor system using the simplest possible computational steps, consistent with the above-listed input data and with a high degree of accuracy, and to perform the desired computation with reliable, proven, components.

In line with the overall object, other specific objects of this invention are to provide a take-off monitor system which will (1) be usable at night and under poor visibility conditions;

(2) automatically provide the pilot with accurate information early in the take-off run so that an abort, if necessary, may be made with adequate safety margin;

(3) give an indication of the consequences of subnormal performance or malfunction which may occur at any later time or position during the take-off run after a normal start has been made;

(4) not require any modifications of the aircraft;

(5) discriminate against other, unwanted, aircraft or moving objects; and (6) satisfy both civil and military requirements regarding take-off operations.

Other objects and advantages of this invention will become apparent upon reading the detailed description of a preferred embodiment to follow, but the invention is not limited to the specific apparatus shown herein, since many modifications may be made without sacrificing the main principles disclosed.

Briefly, as to method, our invention comprises measuring the present position of the aircraft on the runway and predicting the additional runway distance required to reach flying speed. Subtracting the predicted additional runway distance required to reach flying speed from the known remaining runway distance yields the indication of take-off capability. A GO indication is presented to the pilot if the remaining runway distance is greater than the additional runway required. Conversely, a NO GO indication is presented if the runway remaining is less than the additional runway required.

During the first mode of the preferred two-mode system, where it is still possible to effect a safe stop, subtracting the predicted additional runway distance required to reach flying speed from the known distance remaining to the point where normal take-off would occur yields the indication of the GO or NO GO signal to the pilot.

Briefly as to apparatus, our invention comprises a ground based Doppler radar system aligned substantially with the runway to track the aircraft during the take-off run, other necessary instruments to measure wind, temperature, and the like, and a computer to determine take-off capability from the information fed to it, according to the desired formulas devised to accomplish the method, together with system control means and computer output indicating means.

It can be shown that the acceleration of an aircraft during the take-off run is linearly proportional to the square of the true airspeed, and the invention further comprises the discovery that the acceleration of the aircraft between a specific known runway position during take-off and the position where take-off speed is reached may be considered linearly proportional to the distance between these two points, whether the aircraft is jet-engine powered or has a conventional piston engine and propeller. As the take-off position is approached, this assumption becomes more accurate of course, and is exact at the take-off position. Based on this consideration, a particular equation defining take-off capability is selected which is mechanized in the computer by relatively simple means.

Between the Doppler radar system and the computer, a novel improved velocity tracker is provided to isolate the target aircraft signals, reject noise appearing in the radar output, and provide analog representations of aircraft velocity and acceleration to the computer.

In the accompanying illustrative drawings.

Figure 1:
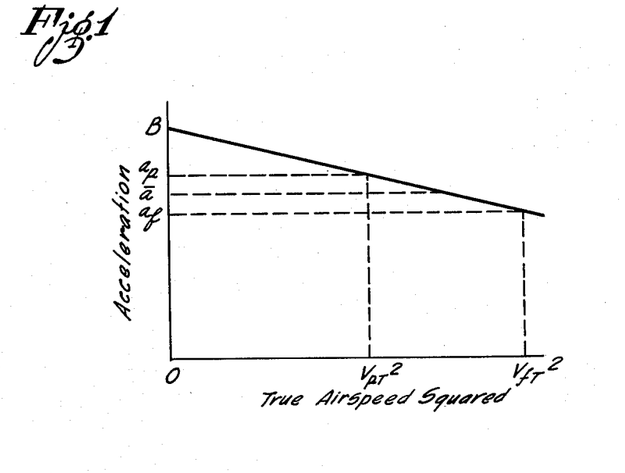
FIGURE 1 is a graph plotting acceleration versus true airspeed squared.

To begin a detailed description of the present invention, a discussion of the derivation of the necessary mathematical equations used to define the "take-off capability" will be given. In this discussion, the following symbols will be used:

$a$ = acceleration
$\bar{a}$ = average acceleration
$a_f$ = final acceleration, at take-off point
$a_p$ = present acceleration, any point during ground roll
$A$ = constant, determined by type of aircraft
$B$ = constant, also determined by type of aircraft
$C$ = constant, also determined by type of aircraft
$f_D$ = Doppler frequency
$F$ = force causing acceleration parallel to runway
$g$ = acceleration due to gravity
$\rho$ = atmospheric density
$P$ = atmospheric pressure
$R$ = gas constant
$S$ = distance, on ground
$S_f$ = point at which take-off airspeed is reached
$S_p$ = present position, any point during ground roll
$S_r$ = total runway length
$T$ = atmospheric temperature
T.O.C. = take-off capability
$V_{fg}$ = final ground speed, at take-off
$V_{pg}$ = present ground speed, any point during ground roll $V_{fT}$ = final true airspeed, at take-off
$V_{pT}$ = present true airspeed, any point during ground roll
$V_T$ = true airspeed
$V_W$ = component of wind velocity in direction of runway
$W$ = gross weight of aircraft Starting with the basic equation $$F = \frac{W}{g} \times a$$

and taking into consideration all the possible forces acting on the aircraft, it can be shown that the motion equation may be written $a = AV_T^2 + B$. If $a$ is plotted as a function of $V_T^2$, it will be a straight line, as shown in FIGURE 1. B is the initial value of acceleration and A is the slope of the line, which is negative. Actual formulas have been mathematically determined for A and B, but they are not believed necessary to a description of this invention. They include, for instance, the effects of the aerodynamic characteristics of the airplane, thrust angle, wing incidence, rolling resistance forces, and runway slope.

Coefficients A and B are constants which depend on the type of airplane whose take-off is being monitored, and are manually set into the system before take-off, as will be described later.

From FIGURE 1, $$\bar{a} = \frac{a_f + a_p}{2}$$

and also $$\bar{a} = \frac{2a_p + A(V_{fT}^2 - V_{pT}^2)}{2}$$

Figure 2:
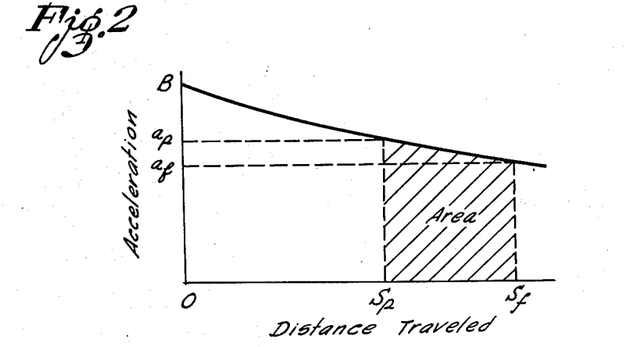
FIGURE 2 is a graph plotting acceleration versus distance traveled.

FIGURE 2 shows acceleration as a function of distance. The significance of the indicated area under this curve can be found as follows:

$$\text{Area} = \int_{S_p}^{S_f} a\, ds = \frac{1}{2}(V_{fg}^2 - V_{pg}^2)$$

As stated previously, this invention considers the curve between $S_p$ and $S_f$ in FIGURE 2 to be a straight line, so that for this permissible assumption, the indicated area is equal to $\bar{a}(S_f - S_p)$. Equating this to the area as found by integration in the next preceding paragraph, $$\tfrac{1}{2}(V_{fg}^2 - V_{pg}^2) = \bar{a}(S_f - S_p)$$

Substituting for $\bar{a}$ the value set forth in the preceding discussion of FIGURE 1, $$\tfrac{1}{2}(V_{fg}^2 - V_{pg}^2) = \frac{[2a_p + A(V_{fT}^2 - V_{pT}^2)](S_f - S_p)}{2}$$

Since $V_{fg} = V_{fT} - V_W$ and $V_{pT} = V_{pg} + V_W$, the final expression for the required additional runway distance to take-off is $$S_f - S_p = \frac{(V_{fT} - V_W)^2 - V_{pg}^2}{2a_p + A[V_{fT}^2 - (V_{pg} + V_W)^2]}$$

Take-off capability was defined as the difference between the predicted additional distance required to reach take-off velocity $(S_f - S_p)$ and the known or measured length of the runway remaining $(S_r - S_p)$, or $$\text{T.O.C.} = (S_r - S_p) - (S_f - S_p)$$

$$\text{T.O.C.} = \frac{V_{pg}^2 - (V_{fT} - V_W)^2}{2a_p + A[V_{fT}^2 - (V_{pg} + V_W)^2]} + (S_r - S_p)$$

The aircraft has the ability to take off within the total runway length $S_r$ if the algebraic sign of T.O.C. is positive. Conversely, it does not if T.O.C. is negative. The apparatus of the present invention continuously computes this expression and indicates its sign during the take-off run, and a preferred embodiment will now be described.

Figure 3:
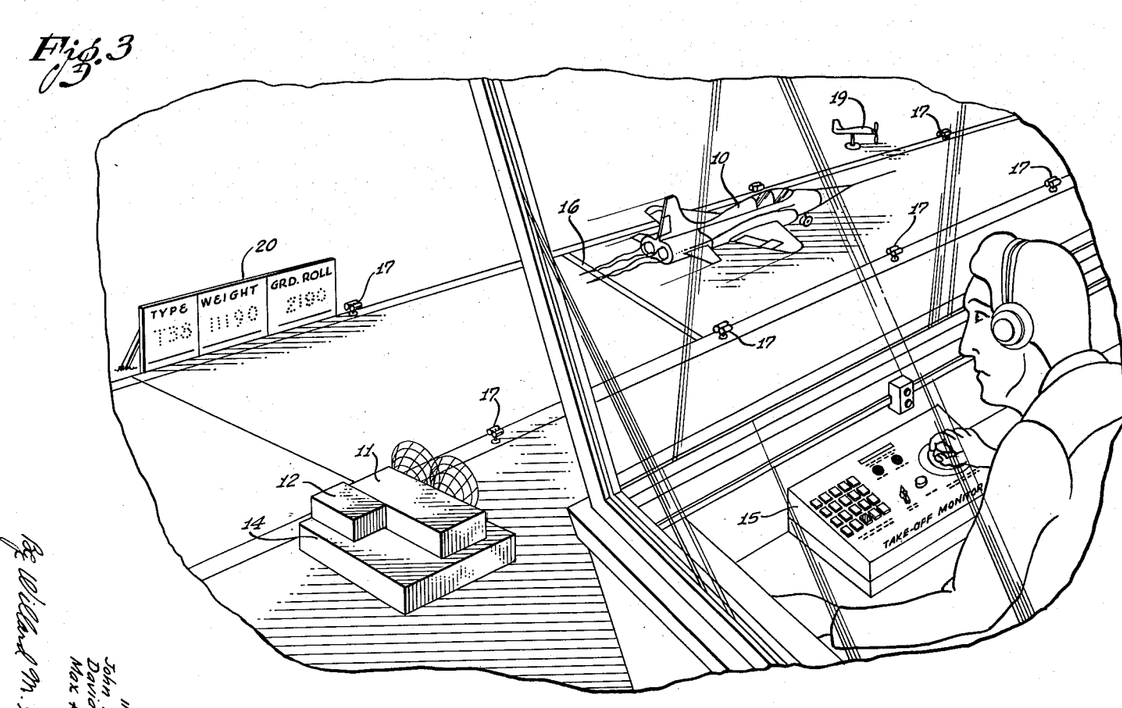
FIGURE 3 is a perspective view showing the take-off monitor system in operation.

In FIGURE 3 is shown the overall picture of the present invention. An aircraft 10 is starting a take-off run while being tracked by the take-off monitor system comprising a Doppler radar system 11, velocity tracker 12, computer 14, tower console unit 15, runway switch actuating means 16, GO-NO GO indicating light assemblies 17, and a metro unit 19 for measuring atmospheric conditions. A visual display 20 may also be included at the head of the runway to show the pilot duplicate information as set up on the console unit 15.

Figure 4:
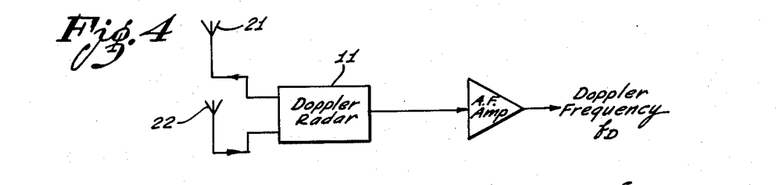
FIGURE 4 is at block diagram of the radar system.

The radar system 11, shown in FIGURE 4, may be any suitable stable Doppler radar system comprising, for example, a transmitting antenna 21, receiving antenna 22, and the conventional components for producing a Doppler frequency $f_D$ which is proportional to the ground speed of the tracked aircraft 10. The radar is preferably located on the extended center line of the runway at either end (it will work for both directions of take-off), but is shown at the corner in FIGURE 3 for illustration only. It may actually be located 200 feet or so beyond the end of the runway. It may also have only one antenna for both transmitting and receiving, if desired.

Figure 5:
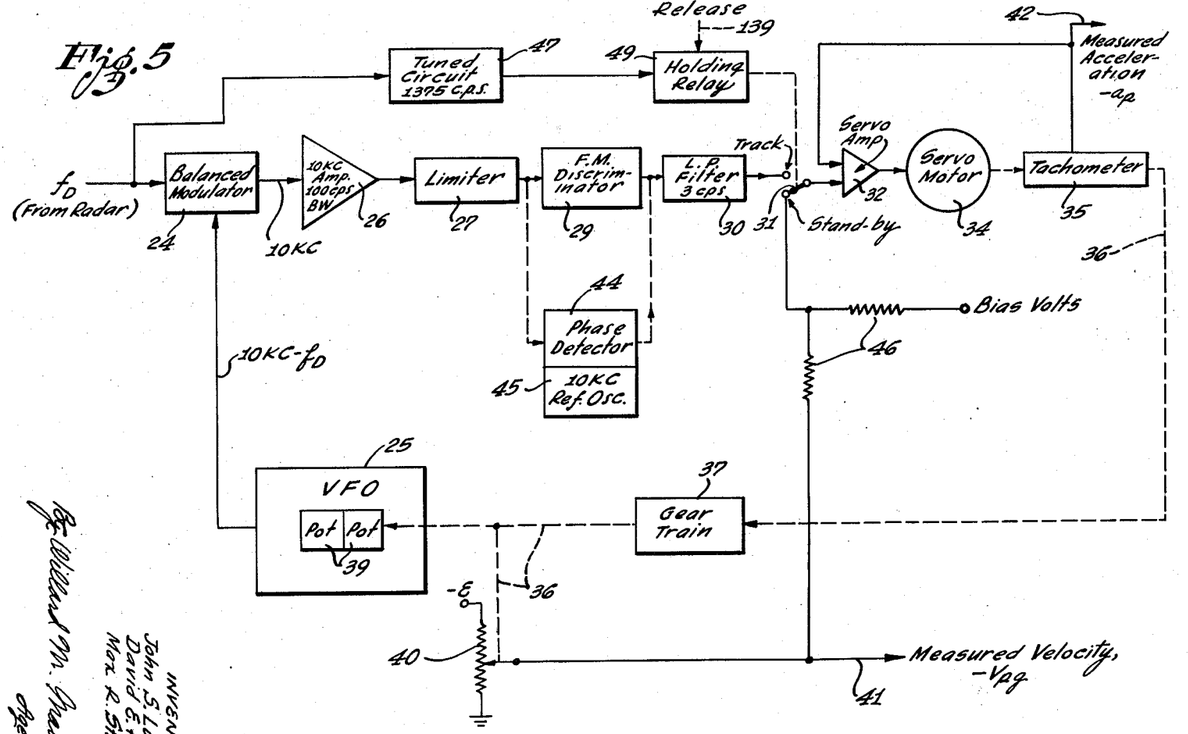
FIGURE 5 is a block diagram of the velocity tracker which follows the radar system.

The novel and improved velocity tracker 12 is shown in FIGURE 5. The Doppler frequency $f_D$ from the radar system output is fed to a balanced modulator 24 along with the output of a variable frequency oscillator 25. This oscillator 25 is made to have an output frequency of ten kilocycles per second minus $f_D$ as will become apparent.

A 10 kc. amplifier 26 with a narrow bandwidth of 100 cycles per second receives the modulator output. If the V.F.O. output is exactly 10 kc.—$f_D$, it is thus seen that the modulator output will have one component frequency of 10 kc. per second and this signal will pass through the 10 kc. amplifier. However, if the modulator output frequency is outside the 100 c.p.s. bandwidth centered at 10 kc., no output from amplifier 26 will occur. The 100 c.p.s. value corresponds to an aircraft velocity of approximately three knots (3.456 miles per hour), so that a "velocity gate" three knots wide is thus provided, to avoid picking up any signals except from the particular target aircraft being tracked. Of course, the system is not restricted to the one particular center frequency of 10 kc. per second.

The signal then passes through a limiter 27, a conventional FM discriminator 29 and a low pass filter 30 having a cut-off frequency of three cycles per second, for example. The discriminator 29 is tuned to 10 kc., so that any difference between the incoming signal frequency and 10 kc. forms an error signal. The latter, during tracking, passes through the "track" position of a tracking switch 31 to a servo amplifier 32 of a velocity tracker servo system also including a servo motor 34 and a very accurate instrument tachometer 35. Dotted lines 36 indicate that the servo drives a gear train 37 which in turn drives a pair of frequency varying potentiometers 39, for example, in the variable frequency oscillator 25 and also a velocity output potentiometer 40.

The servo drives the variable frequency oscillator 25 and maintains its output frequency at 10 kc.—$f_D$. Thus, the position of the servo motor 34 during tracking gives an output signal from velocity potentiometer 40 which represents the measured ground speed $V_{pg}$, on ground speed line 41, and the velocity of the servo motor 34 gives an output signal through tachometer 35 which represents the present measured acceleration $a_p$, on acceleration line 42. For purposes of the computer function to follow, the two outputs $V_{pg}$ and $a_p$ are negative. The acceleration signal from the present apparatus is accurate to within ±.0644 feet per second squared, which is equivalent to .002 g.

If a more accurate discriminating function is desired or necessary, an alternate configuration can be employed using a phase detector 44, with associated 10 kc. reference oscillator 45, in parallel with discriminator 29 to give an output signal representing a fine error into the servo amplifier 32.

In the "standby" position of the tracking switch 31, a bias circuit 46 is provided to drive the V.F.O. 25 to a preset frequency where an $f_D$ value corresponding to 40 knots is necessary to produce a 10 kc. signal to the 10 kc. amplifier 26, i.e., the velocity gate is set at 40 knots. Initiation of tracking can be accomplished only by a target moving through the 40 knot velocity while the system is not tracking. At this velocity, the Doppler frequency $f_D$ is 1375 c.p.s. and a tuned circuit 47 responds to energize a holding relay 49 and actuate the tracking switch 31 to the "track" position. Other equivalent means could also be used to actuate the tracking switch 31 when the target aircraft reaches 40 knots, if desired, and this initial tracking velocity could obviously be changed if desired. The holding relay 49 may be released at a given signal after one airplane has taken off so that the velocity tracker 12 will return to a standby condition ready for the next use.

Figure 6:
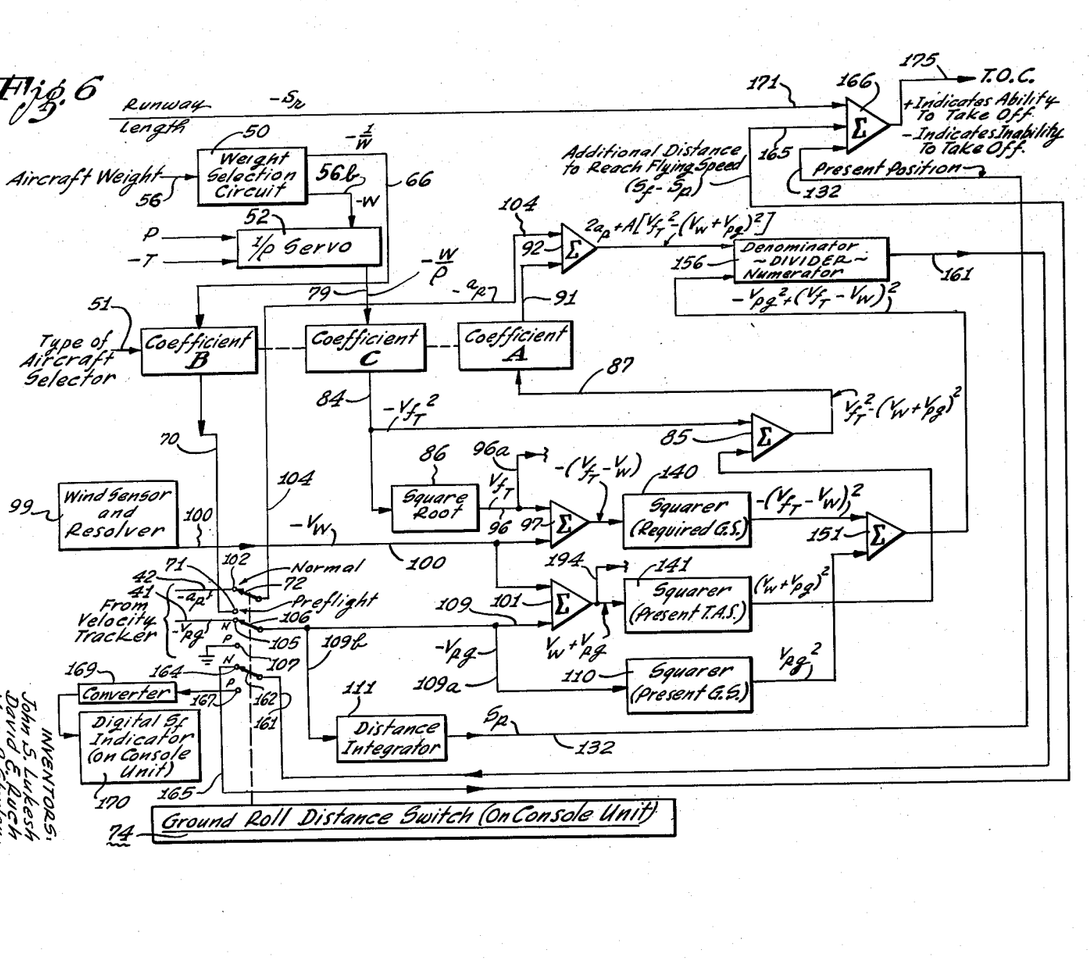
FIGURE 6 is a block diagram of the computer which measures and predicts take-off capability.
Figure 7:
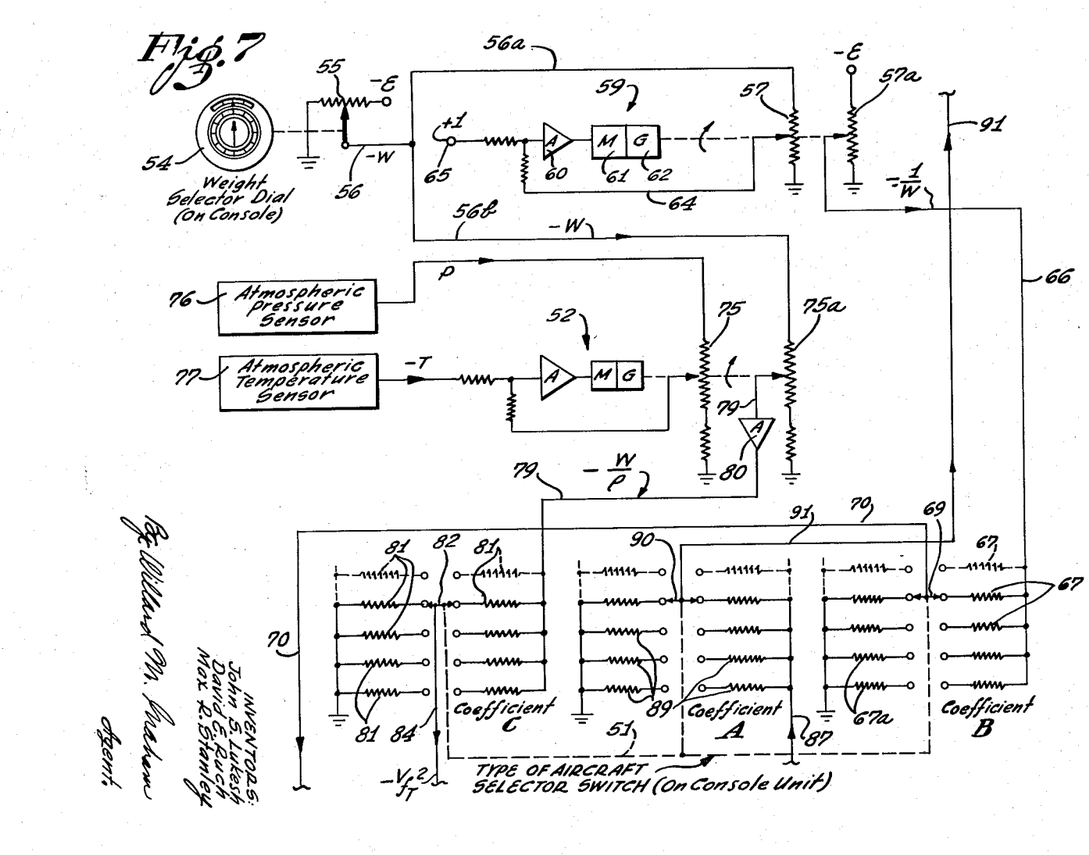
FIGURE 7 is a combination block and schematic diagram showing the aircraft weight selection input, air density servo, and aircraft type selection switch details of the computer.

FIGURE 6 shows in block diagram form the complete computer, which takes its inputs from the velocity tracker 12 and from other sources as will be shown. A weight selection circuit 50 and an aircraft selector switch indicated by arrow 51 are discosed in detail in FIGURE 7, together with an atmospheric sensor servo 52. Referring to FIGURE 7 in conjunction with FIGURE 6, the manual setting of a weight selector dial 54 adjusts a weight potentiometer 55 to provide an output voltage on potentiometer output lead 56 proportional to the gross weight of the aircraft to take-off, this being a negative value. Lead 56a goes to one of two ganged servo potentiometers 57 and 57a driven by an inversion servo 59, which servo comprises a servo amplifier 60, motor 61, and gear train 62. The output of the first servo potentiometer 57 is fed back to the input on feedback line 64, and an input terminal 65 has a constant potential corresponding to a value of "one." Thus, the output from the second servo potentiometer 57a, which is energized at one end by a supply voltage —E, has a value of —1/$W$ on servo output lead 66, since this servo acts as a divider, giving the reciprocal of —$W$.

The servo output lead 66 connects with one end of a series of predetermined voltage divider resistors 67, each of which is connectable in series with other divider resistors 67a by one switch arm 69 of the multiple section aircraft selector switch 51. The position of this manually set switch 51 applies a coefficient B to the value —1/$W$, and a coefficient B output line 70 from switch arm 69 carries the resulting potential to the lower (preflight) contact position 71 of a first pole 72 of a manually operated ground roll distance switch 74 in FIGURE 6.

Weight potentiometer output lead 56b is connected to one of two sensor servo potentiometers 75 and 75a as also shown in FIGURE 7. An atmospheric pressure sensor 76 is connected with its output P to the other potentiometer 75, and an atmospheric temperature sensor 77 is connected with its output —T to the input of the sensor servo 52. The sensors 76 and 77 may be any suitable commercial article for these purposes, for example a Bendix Weatherman Model 166 pressure sensor and a Bendix Weatherman Model 505–1 temperature sensor, and may be mounted in the metro unit 19 shown in FIGURE 3.

The sensor servo 52 is similar to the inversion servo 59 in that it comprises an amplifier, motor, gear train, and driven potentiometers as shown. Since $$\frac{1}{\rho} = \frac{RT}{P}$$

the angular position of the servo output is indicative of 1/$\rho$, and the final output from this servo 52 on sensor servo output line 79 is —$W/\rho$.

The latter output line 79, which may require a line amplifier 80 therein, is connected to voltage divider resistors 81 forming another section of the aircraft selector switch 51. Switch arm 82 of this section provides an output on coefficient C output line 84 which is equal to —$W/\rho$ multiplied by a numerical coefficient C depending on switch position, and this output represents the square of the true airspeed required for take-off of the particular aircraft corresponding to the position of aircraft selector switch 51.

Coefficient C output line 84 connects to one input of a first adder 85 (FIGURE 6) and to a square root servo 86.

The third switch section in FIGURE 7 has a coefficient A input line 87, predetermined divider resistors 89, and a switch arm 90 connected to a coefficient A output line 91. Coefficient A input line 87 comes from the output of the first adder 85, and coefficient A output line 91 connects to one input of a second adder 92.

Figures 8, 14:
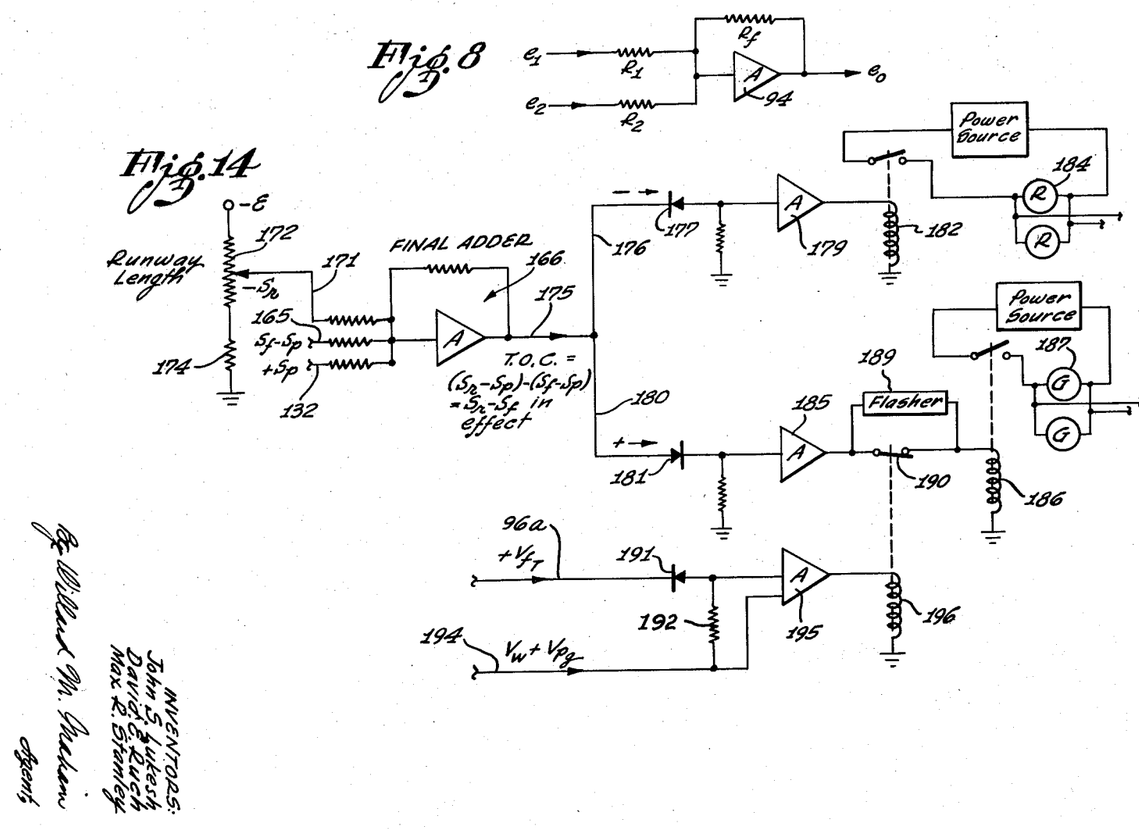
FIGURE 8 is a schematic diagram showing a typical adder used in the computer.
FIGURE 14 is a schematic diagram of the final adder of the computer, and the output signal indicating means of the present system.

FIGURE 8 shows a typical adder as used in this computer. Each adder comprises a conventional summing amplifier 94 with input resistors $R_1$ and $R_2$ and a feedback resistor $R_f$. The ratios are such that the relationship $$e_0 = \frac{R_f e_1}{R_1} + \frac{R_f e_2}{R_2}$$

exists. By properly selecting the resistor values, the output voltage $e_0$ will give $e_1+e_2$, as is well known, or $e_0$ will give the sum of the products of some fixed constant other than one times each input voltage, as is also well known.

Normally, the signal polarities are reversed when passing through the adders, since the internal amplifier usually changes the phase angle of the signal by 180 degrees, so that the algebraic sign is changed from input to output of an adder. This will be easily seen in the legends on the signal lines in the drawings identifying the respective signal values therein. For the second adder 92, however, an extra explanation will be given at this point, before the complete computer connections are subsequently described. It will be noted that the input signal to second adder 92 on connecting lead 104 is a negative voltage $-a_p$, and the other input signal on coefficient A output line 91 has the value $A[V_{fT}^2-(V_W+V_{pg})^2]$. This will be a positive voltage, due to the circuit structure. However, the coefficient A in the basic equation $a=AV_T^2+B$ is actually a negative quantity. Therefore, when the polarity is reversed in the adder, the first input signal $-a_p$ will change sign to a positive quantity (in $2a_p$), and the other input signal also changes sign so that the portion of the output signal represented by the second term starting with "+A" shown in the output of second adder 92 is actually a negative voltage, thus achieving the proper desired signal which is equivalent to adding a negative quantity A.

Since the term $2a_p$ is required in the equation, the input resistors within the second adder 92 are proportioned to give twice the effect to the $-a_p$ input signal as it does to the longer expression in the other input signal.

Figure 9:
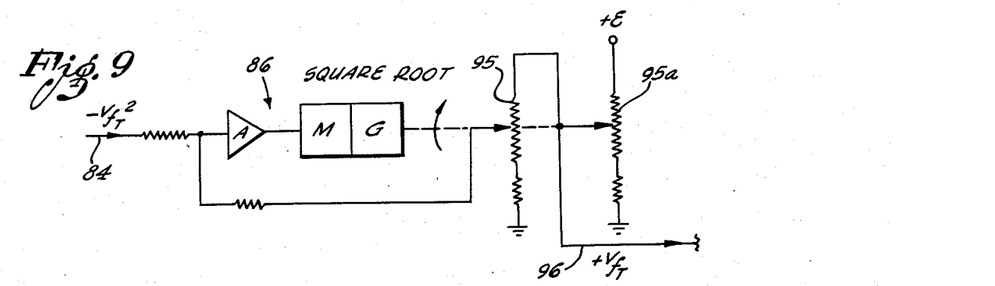
FIGURE 9 is an operational diagram of a servo for obtaining square root as used in the computer.

FIGURE 9 illustrates the square root servo 86. Its input is $-V_{fT}^2$ and the servo-driven output potentiometers 95 and 95a are interconnected as shown and provided with a supply voltage $+E$ so that the output on square root servo output lead 96 is $+V_{fT}$. This output lead 96 is connected to one input of a third adder 97 in FIGURE 6.

A wind sensor and resolver 99, which may also be incorporated in the metro unit 19 (FIGURE 3), has a signal line 100 carrying a voltage corresponding to $-V_W$ connected to the second input of the third adder 97 and to one input of a fourth adder 101. The wind sensor and resolver 99 may be any suitable conventional instrument for giving an electrical signal proportional to the component of wind velocity parallel to the runway, such as the Bendix Aerovane Model 120, for example. $V_W$ is positive in the case of a head wind, and negative for a tail wind.

Acceleration line 42 from the velocity tracker 12 connects to the upper (normal) contact position 102 of the ground roll distance switch first pole 72. A connecting lead 104 from this first pole 72 goes to the other input of the second adder 92.

The ground speed line 41 from the velocity tracker 12 connects to the "normal" contact position 105 of a second pole 106 of the ground roll distance switch 74. The second pole "preflight" position 107 is grounded, to give a zero signal. Second pole feed lines 109, 109a, and 109b normally connect $-V_{pg}$ to the second input of fourth adder 101, to a present ground speed squarer 110, and to a distance integrator 111, respectively.

Figure 10:
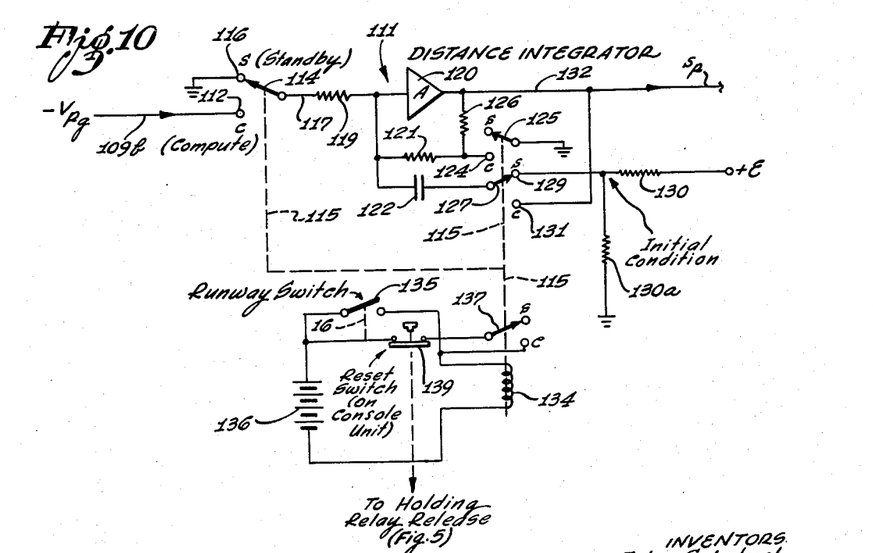
FIGURE 10 is a schematic diagram showing the distance integrator of the computer and the runway switch for starting computation.

FIGURE 10 shows details of the distance integrator 111 and associated circuits. The feed line 109b carrying the signal $-V_{pg}$ to the integrator 111 is connected to a "compute" position 112 of a first pole 114 of a four-pole computing switch 115. The other position of this first pole 114 is a "standby" contact 116 which is grounded. The first pole 114 itself is connected to an integrator input line 117 containing a series resistance 119, which is in turn connected to the input of an integrating amplifier 120. An input resistance 121 and an integrating capacitance 122 are also connected at one end of each to the integrating amplifier input. The other end of the input resistance 121 is connected to a "compute" contact 124 of a computing switch second pole 125, and an output resistance 126 is connected between the output of the integrating amplifier 120 and this latter "compute" contact 124. The other end of capacitance 122 is connected to a third pole 127 of the computing switch 115.

Computing switch second pole 125 is grounded. A third pole standby contact 129 is connected to the junction of two "initial condition" resistors 130 and 130a which are connected between ground and a D.C. supply voltage $+E$. A third pole compute contact 131 is connected to an integrator output line 132 which carries the signal $S_p$ from the output of the distance integrator 111 to the remainder of the computer circuitry.

As also shown in FIGURE 10, the computing switch 115 is actuated from standby to compute by a relay coil 134 which is energized by closure of a runway switch 135, from a power source such as a battery 136, for example. The runway switch 135 is actuated by the actuating means 16 further indicated in FIGURE 3, which means is tripped by the aircraft after starting its take-off run. Such actuating means 16 may comprise any suitable structure to be tripped by the aircraft at a predetermined position, such as a pneumatic signal hose extending across the runway, or a photo-electric cell circuit, for example.

The tripping position is located far enough down the runway so that the slowest expected aircraft will have reached the 40 knot ground speed required to initiate tracking by the velocity tracker 12 previously described, before the runway switch 135 is closed. This tripping position may be about 500 feet from the starting point, for example.

A computing switch fourth pole 137 is wired in the battery circuit to act as holding contacts to keep the relay coil 134 energized after the runway switch 135 has once been actuated. A reset switch 139 will be manually operated open after the aircraft has taken off, to allow the computing switch 115 to return to its standby position. Reset switch 139 is also preferably mechanically linked to the release of the holding relay 49 in the velocity tracker 12.

Referring back again to FIGURE 6, the output of the third adder 97 is fed to a required ground speed squarer 140, and the output of fourth adder 101 is fed to a present true airspeed squarer 141. These two squarers 140 and 141 are practically identical and are represented by the squaring servo shown in FIGURE 11. The input voltage to be squared is fed both to the input circuit 142 of a squaring servo amplifier 144 and to the upper end of an output potentiometer 145a whose shaft is coupled to a follow-up potentiometer 145 driven by a servo motor 146 through a gear train 147.

Figure 11:
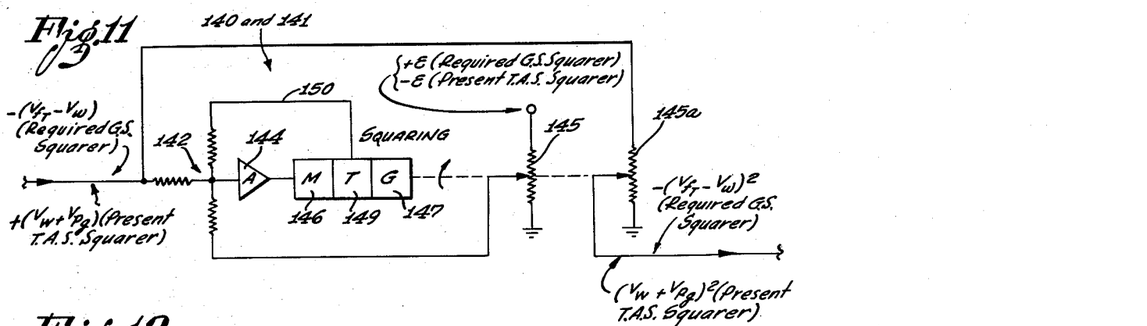
FIGURE 11 is an operational diagram of a squaring servo as used in the computer.

In the case of these squaring servos, the information is changing rapidly enough so that a servo tachometer 149 is preferably included between the motor 146 and gear train 147, for the purpose of providing a rate feedback signal along feedback wire 150 to the input circuit 142. Thus, the squaring servo output will have no time lag and will always provide an accurate output signal. The operation of these squaring servos, when the potentiometers 145 and 145a are connected and energized as shown in FIGURE 11, is conventional and need not be described in detail herein.

The output signal $-(V_{fT}-V_W)^2$ from required ground speed squarer 140 is fed to one input of a fifth adder 151, while the output signal $(V_W+V_{pg})^2$ from present true airspeed squarer 141 is fed to a second input of the first adder 85, as shown in FIGURE 6.

Figure 12:
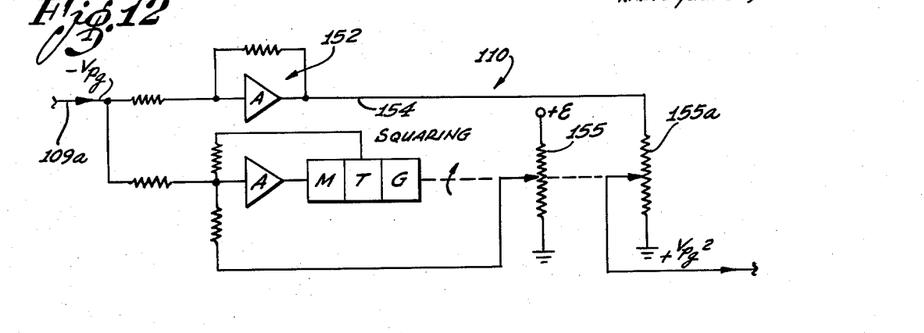
FIGURE 12 is a diagram of another squaring servo in the computer.

The present ground speed squarer 110 is shown in FIGURE 12, and is very nearly the same as the other two squaring circuits just described. The sign of the input quantities to the required ground speed squarer 140 and to the present true airspeed squarer 141 remain the same in the outputs. However, it is desired to invert the sign of the $-V_{pg}$ quantity to be squared in the present ground speed squarer 110. Hence, a polarity inverting amplifier 152 with unity gain is provided in the parallel feed line 154 from the servo input to this servo's output potentiometer 155a. This will give a positive voltage representing $V_{pg}^2$ at the output of squarer 110, which is fed to a second input of the fifth adder 151 in FIGURE 6.

Figure 13:
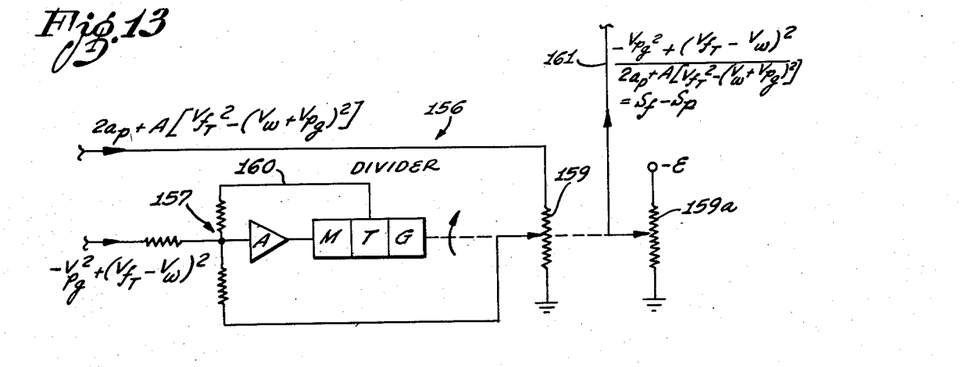
FIGURE 13 is a diagram of the divider in the computer.

The output of the second adder 92 and of the fifth adder 151 are fed to a divider 156, which is further shown in FIGURE 13. Again, this is a conventional servo, with the numerator $-V_{pg}^2+(V_{fT}-V_W)^2$ connected to the servo input summing point 157, and the denominator $2a_p+A[V_{fT}^2-(V_W+V_{pg})^2]$ connected to the top of a first follow-up potentiometer 159. This unit is similar to the inversion servo 59 except that a tachometer feedback 160 is provided for faster response. A divider output line 161 from the tap of a divider output potentiometer 159a carries the quotient signal, and is routed (FIGURE 6) to a third pole 162 of the ground roll distance switch 74.

A normal position contact 164 of the ground roll distance switch third pole 162 is connected by a conductor 165 to one input of a final adder 166. A preflight position contact 167 of the ground roll distance switch third pole 162 is connected to an analog-to-digital converter 169, and a digital take-off distance indicator 170 is connected to the output of the converter 169.

The integrator output line 132 and a runway length line 171 connect to two other inputs of the final adder 166, as further shown in FIGURE 14. Here, the runway length line 171 comes from a preset value on a runway length potentiometer 172, for example, which is connected in series with an additional resistance 174 between a source of D.C. voltage $-E$ and ground. The three terms to be added by the final adder 166 are thus $-S_r$, $S_f-S_p$, and $+S_p$. The sum of these values in a final adder output line 175, when inverted in sign by the adder, is the output signal of the computer 14, and represents the take-off capability $S_r-S_f$.

For actual presentation to the pilot, this output may be handled in any suitable way to actuate a desired type of GO—NO GO indicator. The indicator output circuits shown in FIGURE 14 disclose one type of apparatus which may be employed. If the T.O.C. signal is negative, an upper diode circuit 176 connected to the cathode of a first diode 177 responds to present a signal to a first relay amplifier 179, while a lower diode circuit 180 connected to the anode of a second diode 181 does not respond. The first relay amplifier 179 will thus actuate a red light relay 182 and cause a series of red NO GO lights 184 to be illuminated. If the T.O.C. signal is positive, the upper diode circuit 176 does not respond, while the lower diode circuit 180 does respond to present a signal to a second relay amplifier 185. A green light relay 186 will thus be normally actuated to illuminate a series of green GO lights 187. One each of the green lights and red lights are installed in each one of the indicating light assemblies 17 spaced along the runway in FIGURE 3.

The green light circuit in FIGURE 14 includes a flasher 189 between the second relay amplifier 185 and green light relay 186, paralleled by a normally closed switch 190 which is controlled by the following circuit.

The square root servo output lead 96 has a branch 96a which conducts the $+V_{fT}$ signal to the cathode of a detector diode 191 and from thence to one end of a resistor 192, as shown in FIGURE 14. The output from the fourth adder 101 has a pick-off line 194 which conducts the $V_W+V_{pg}$ signal to the other end of resistor 192. A take-off airspeed amplifier 195 is connected with its input across the resistor 192, and a flasher relay 196 in the amplifier output opens the normally closed switch 190 when the amplifier 195 has an output signal caused by voltage developed across the input resistor 192. This latter will happen when $V_W+V_{pg}$ is more positive than $V_{fT}$.

Other types of indicating means could obviously be used. The signal to the pilot might be through his radio, or wired into his marker beacon light, or actuate separate visual or aural instruments in the flight compartment, to name a few of the suitable possibilities.

Figure 15:
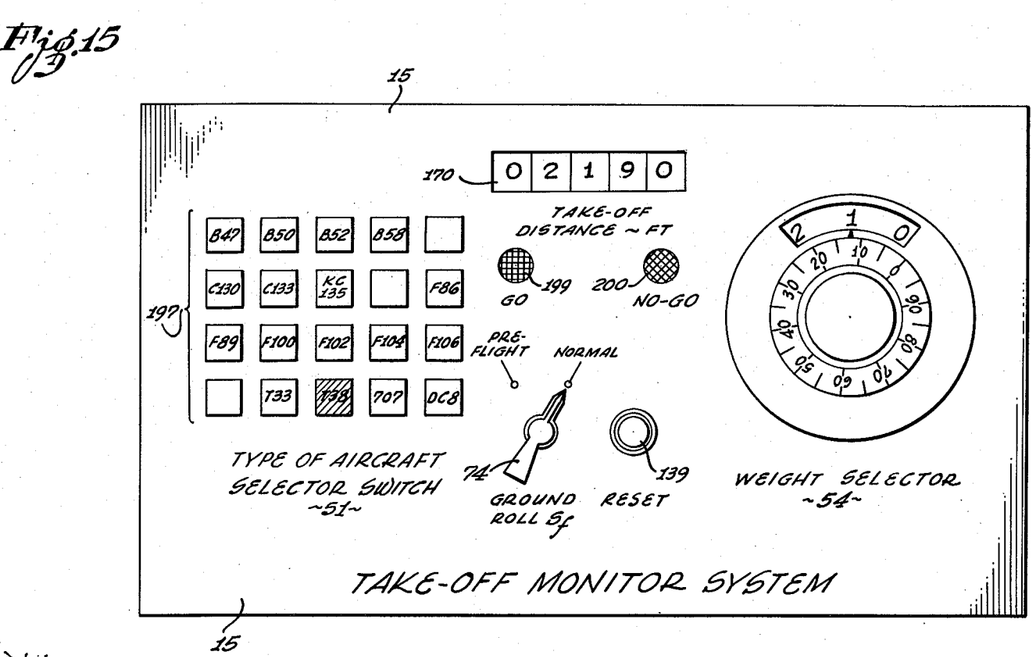
FIGURE 15 is a front view of a console control unit for use with the take-off monitor system.

FIGURE 15 shows the necessary controls on the console unit 15 of FIGURE 3. Of course these controls or their equivalents may be located or built in anywhere desired, and do not have to be in the airport control tower. However, for actual production use of the present system, it is preferred that the operation be done by the tower operator, during communication with the pilot of the aircraft ready to take off.

The aircraft selector switch 51 may comprise a number of push buttons 197, for example, the one which is selected being latched down until released by pushing another. Each button corresponds to a particular aircraft type, and will set up the proper coefficients A, B, and C into the computer as shown in FIGURE 7. The weight selector dial 54, also shown in its circuit in FIGURE 7, appears on the console unit 15. Also available on the console unit 15 are the ground roll distance switch 74 (from FIGURE 6), reset switch 139 (from FIGURE 10), take-off distance indicator 170 (from FIGURE 6), and GO and NO GO pilot lights 199 and 200 connected effectively in parallel with the GO lights 187 and NO GO lights 184, respectively.

The various switches and the like on the console unit 15 may be wired directly to their circuitry in the computer 14 if the distance is not too far, or they may be connected by suitable remote control apparatus (not shown) if this would be more practical. Such remote control circuitry, plus the required power supplies and associated equipment, are not part of this invention.

From the take-off capability equation shown previously in this specification, $$T.O.C.=\frac{V_{px}^2-(V_{fT}-V_W)^2}{2a_p+A[V_{fT}^2-(V_{px}+V_W)^2]}+(S_r-S_p)$$

it will be seen that all the quantities on the right-hand side are measured quantities during the computation except $V_{fT}$ and A, which must be provided beforehand.

Coefficient A is the slope of the line representing acceleration versus true airspeed squared, as was shown in FIGURE 1, and is characteristic of each different aircraft type. Hence, its value may be determined by measuring and recording acceleration and true airspeed data during any sample take-off run of one aircraft for a particular type, or by referring to flight handbooks of the airplane to determine this coefficient. Then the divider resistors 89 in the coefficient A section of aircraft selector switch 51 are set up to apply this coefficient at the switch arm 90. For an F-89 airplane, coefficient A is $-1.55 \times 10^{-5}$ feet$^{-1}$, for example.

For the quantity $V_{fT}$, the relation $$V_{fT}^2 = C \times \frac{W}{\rho}$$

is used. The atmospheric sensor servo 52 in FIGURE 7 generates an output on output line 79 proportional to $-W/\rho$ as previously explained. This signal is then modified by coefficient C at line 84 of aircraft selector switch arm 82 to provide $-V_{fT}{}^2$. Here again, coefficient C may be determined from known data for each aircraft type on the minimum take-off airspeed in terms of $$\frac{\sqrt{W}}{\rho}$$

and the values of voltage divider resistors 81 for coefficient C are proportioned accordingly. If the above data is not known, say for a new type airplane, it may be obtained by flight testing, of course. For an F-89 airplane, a typical value of $V_{fT}$ is 205 feet per second, for example.

Thus it is shown where all of the signals for the computation of T.O.C. by the present invention originate. Coefficient B is not necessary in this computation at all, since it does not appear in the T.O.C. equation. Actually, during the tracking and computation period while the aircraft is in the take-off run, B will be the measured value of $a_p$ for every instant that the capability is predicted.

It must be stressed that this invention continuously keeps predicting the remaining performance of the aircraft taking off, based on its ever-changing present or instantaneous actual measured performance. It will also be seen that as the limit take-off point is approached, this prediction becomes even more and more accurate, since obviously the time and distance through which the prediction applies approaches zero, and then it becomes completely a matter of measurement only, with no future prediction necessary.

Coefficient B is, however, used in the present system to provide an extra feature, aside from computing T.O.C., and that is the one initially showing a check value for the total runway distance normally required for take-off, before the run is started, considering the present existing conditions of wind, temperature, pressure, and aircraft weight. It is termed normal because it is based on an assumed normal performance of the aircraft and proper operation of the aircraft by the pilot.

Therefore, a value for coefficient B is provided, as was shown in FIGURES 6 and 7, to be used when the ground roll distance switch 74 is turned to the preflight position. This coefficient is the initial acceleration of the aircraft as soon as take-off power is supplied and the airplane starts to take-off run, and is dependent on the gross weight of the aircraft. Hence by proportioning the voltage divider resistors 67 and 67a connected to selector switch arm 69 in accordance with known aircraft initial acceleration data, and modifying this in inverse proportion to the gross weight W, as described and shown in FIGURE 7, the required value is provided on coefficient B output line 70. For an F-89 airplane, a typical value of coefficient B is 6.5 feet per second, for example. Of course, actual initial acceleration of any aircraft is also modified by wind velocity, but the $V_W$ signal is fed into the present system elsewhere, and coefficient B itself is considered a constant for any one aircraft type.

For a proper understanding of the operation of our invention, a typical procedure will now be described.

First, when an airplane to use this system taxis to the take-off starting point, the pilot will contact the tower operator or system console operator, and announce the aircraft type and its gross weight for this take-off. The operator then sets the aircraft selector switch 51 and the weight selector dial 54 accordingly. The resistors in the selector circuits for establishing the coefficients A, B, and C have been determined on the basis of known characteristics of the aircraft type, as previously described.

The operator also turns the ground roll distance switch 74 to the preflight position. This feeds coefficient B through the first pole 72 of the latter switch into the computer in place of the acceleration signal $a_p$ which will normally go to the computer during the ensuing take-off run. At the second pole 106 of this switch, a zero signal from ground is fed into the computer, representing zero ground speed $V_{pg}$.

The output of the divider 156 will now represent $S_f$, since $S_p$ is zero. Accordingly, the divider output is switched through the ground roll distance switch third pole 162 to the take-off distance indicator 170, which may be a digital voltmeter with a stop mechanism for example, and the distance is read off to the pilot. If the visual display 20 (FIGURE 3) is also used, the pilot can verify to his own satisfaction that the monitor system has been set up correctly. If it is now determined on the basis of present information that the aircraft will not be able to take off in the available distance or if the pilot feels there is not a sufficient safety margin, the operation may be called off at this point.

Next, the operator returns the ground roll distance switch 74 to the normal position, and the pilot commences take-off. The tracking switch 31 in the velocity tracker 12 is in the standby position, and the computing switch 115 in the distance integrator 111 is in the standby position, with the runway switch 135 open. The runway length potentiometer 172 has been set to give the proper signal on runway length line 171 which represents $S_r$. This is a constant for any one runway, of course, and is never changed after once being set, unless correction becomes necessary.

When the aircraft reaches a ground speed of 40 knots in its acceleration along the runway, the tracking switch 31 is automatically actuated from standby to the track position and stays there, as previously described. The radar and velocity tracker 12 are now locked onto the aircraft, and measured ground velocity and acceleration signals are being fed to the computer 14.

Next, when the aircraft reaches the location of the runway switch actuating means 16, the runway switch 135 is automatically closed to actuate the computing switch 115 from standby to the compute position. In the standby position, the integrating capacitance 122 had been charged up to an initial value representing the known distance from the starting point to the runway switch actuating means 16. The input circuit to the distance integrator 111 had been grounded at the computing switch first pole 114, and the output on integrator output line 132 had therefore been zero. Now at the moment of computing switch operation from standby to compute, the initial condition charge on integrating capacitance 122 is switched to the output line 132 through the computing switch third pole 127, and simultaneously the measured ground speed signal $-V_{pg}$ from the velocity tracker 12 is applied to the integrator input.

Thus the output at this instant rises to a value corresponding to the initial distance the aircraft has just traveled, and continues to increase, as the ground speed is integrated, to provide an accurate signal on integrator output line 132 representing the present position $S_p$. The computing switch 115 remains in the compute position due to the holding contacts of its fourth pole 137, regardless of the opening of runway switch 135.

From this time on, the monitor system is in complete steady operation, with a T.O.C. signal being produced at the output of the final adder 166 in accordance with aircraft performance. In other words, the green GO lights 187 will be illuminated if a successful take-off is indicated, i.e., if satisfactory present performance continues so that T.O.C. remains positive. If, however, the aircraft acceleration (for instance) drops for any reason to a value which if continued would not produce a successful take-off, the T.O.C. output signal will go negative and the red NO GO lights 184 will come on instead of the GO lights 187.

This operation continues as long as the aircraft is in the tracking region or field of the system. Additionally, when take-off airspeed is reached, the green GO lights 187 will begin flashing off and on, to act as a further help to the pilot and indicate that the system has determined he can lift the aircraft off when desired. The means for this was described and shown in FIGURE 14. Obviously, when the measured $V_\text{w}+V_\text{pg}$ exceeds the required $V_\text{fT}$, flying speed is achieved, and a current will be allowed to flow through the detector diode 191 and resistor 192 in FIGURE 14. The resulting voltage across resistor 192 will produce an output signal from take-off airspeed amplifier 195 to enable flasher relay 196 to open normally-closed switch 190. Thus, the flasher 189 will be operatively connected in the circuit of the GO lights 187.

After this aircraft has taken off, for example, the tower operator presses the spring-return reset switch 139, returning the computing switch 115 and the tracking switch 31 to their respective standby positions and the entire system is ready for the next use.

The foregoing description has been of a system operation wherein the take-off capability (T.O.C.) is the sole criterion for determining the GO or NO GO signal to the pilot. In a slightly different method, two modes of operation are involved, as previously mentioned in the introduction and objects.

Figure 16:
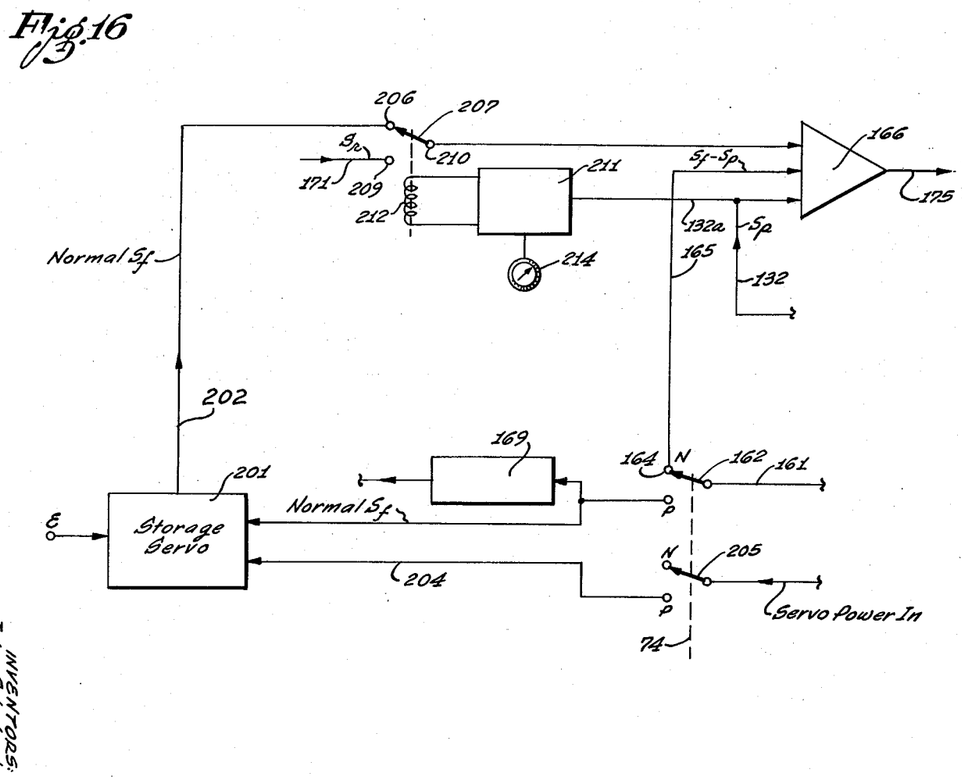
FIGURE 16 is a schematic diagram of a portion of the computer, showing an improved mode of operation of the total system, preferred over that of FIGURE 6.

FIGURE 16 shows the computer embodiment which provides the two-mode system. Referring to this drawing for a description of the preferred apparatus, it will be seen that in the preflight position of the ground roll distance switch 74, the divider output line 161 is connected through the switch pole 162 to the converter 169 as previously described, and also to a storage servo 201. This, in effect, stores the signal representing the normal take-off distance, as well as presenting it on the take-off distance indicator 170. Power to drive the servo 201 to a null position where the voltage on a servo output line 202 equals the input signal voltage from the divider output line 161, is supplied on a power line 204 which is opened by a fourth pole 205 of the ground roll distance switch 74 when switched to the normal (N) position. Thus, with a constant signal voltage supply E always connected to the servo 201, the value of the normal take-off distance signal, herein called "normal $S_f$," will be constantly available on servo output line 202 for as long as required in the take-off.

Servo output line 202 connects to a normally closed contact 206 of a mode-changing switch 207. The runway length line 171, instead of going to the final adder 166, connects to a normally open contact 209 of the mode-changing switch 207, while the pole 210 of the latter switch 207 connects to the upper input of the final adder 166.

The integrator output line 132 has a branch 132a which leads to an electronic switch 211, such as a Schmitt trigger circuit, for example. When the signal voltage $S_p$ on line 132 increases to a predetermined value during the take-off run, the electronic switch 211 will energize a second-mode relay 212 and actuate the mode-changing switch 207 from the servo output line 202 to the runway length line 171.

Thus, during the first mode of operation, output of the final adder 166 will be a measure of normal $S_f$ minus $S_f$, and during the second mode will be a measure of $S_r-S_f$, or T.O.C. The former indication (during the first mode) is more critical in assessing the situation, i.e., will go negative sooner than the latter would, and will thus produce a NO GO output signal to the pilot even if the actual T.O.C. signal using $S_r$ instead of normal $S_f$ is still positive.

For each type of airplane, the users of the present system will determine the point at which it is desired to change modes, and will set an electronic switch adjustment means 214 as required. This point should be where the region of stopping questionability starts. In other words, during the first mode, the present invention instructs the pilot to abort if performance is subnormal where it is safe to stop; and during the second mode, instructs the pilot to abort if flying speed will not be attained at the limit of the runway.

It will be seen that the distance measurement of this system is obtained by very accurate means, as well as the acceleration measurement. An exact measurement of ground speed is provided by the Doppler radar, and a single integration of this value gives the distance. Thus, the accuracy and reliability are inherently far greater than that which would be obtained by a double integration of an acceleration measurement, especially if the latter were obtained by an instrument installed in the aircraft.

It will also be understood that various amplifiers may be needed in the computer circuitry to obtain the desired relative amplitude of signals, and to adapt the outputs of certain measuring instruments to the inputs of the computer, for example. Amplifiers, as needed, are merely conventional units which those who are skilled in the art will readily appreciate.

Thus it is seen that the present invention provides a new and useful solution to the problem of evaluating take-off capability of an aircraft, particularly jet aircraft whose characteristics have accentuated the need for a much better system than has existed until now. The ground based system can make optimum use of all the data required for an adequate indication of take-off capability, and only a Doppler type of radar system is believed capable of supplying satisfactory accuracy of aircraft motion measurements.

While a ground based system can naturally be more heavy and complex than a system installed in the aircraft, the present invention has provided the required functions in a novel manner with the minimum amount of apparatus, by simplifying the ground roll equation to be treated in the computer. The servos and other components in the computer and in the system as a whole are standard "off-the-shelf" items, so that no new equipment need be developed to practice the teachings of this invention.

It is obvious also that this invention, while being ground based, has provided means for discriminating against moving objects or aircraft other than the one for which it is intended, both in initially picking up the desired target aircraft and in remaining locked onto it to the exclusion of other such objects as might cause "noise" signals or a loss of the desired aircraft signal during take-off, and further, that the present invention automatically provides the pilot with accurate take-off information from a point very early in the take-off run until the operation is completed.

It will be stressed again that the present invention works equally well for jet aircraft, turbo-prop or prop-jet aircraft, and piston engine aircraft, since the basic equation $a=AV_\text{T}^2+B$ holds true for all these types. The reason for the present invention at this time is that there is a much greater need for such in a jet aircraft, as shown by the pilot's problems mentioned hereinbefore.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A take-off monitor system comprising a ground-based radar adapted to track an aircraft during its take-off ground roll; atmospheric measuring instruments; a computer connected to the outputs of said radar and said instruments and comprising means for continuously evaluating the present acceleration and position of the aircraft being tracked, means for continuously computing the additional distance needed to reach flying speed based on present aircraft performance, means for continuously evaluating the remaining runway length available, and means for continuously subtracting said additional needed distance from said remaining runway length, whereby the result of said subtraction indicates whether the aircraft will take-off safely; control means connected to said computer for setting in predetermined constants for the particular aircraft being tracked; and GO—NO GO indicating means connected to the output of said computer to indicate whether safe take-off will be achieved.

2. A take-off monitor system comprising a ground-based radar adapted to track an aircraft during its take-off ground roll; atmospheric measuring instruments; a computer connected to the outputs of said radar and said instruments and comprising means for continuously evaluating the present acceleration and position of the aircraft being tracked, means for producing a first signal representing the total distance to the normal take-off point, means for continuously producing a second signal representing the additional distance needed to reach flying speed based on present aircraft performance, means for continuously producing a third signal representing the remaining distance to said normal take-off point, means for continuously producing a fourth signal representing the remaining runway length available, subtracting circuit means, means for feeding into said subtracting circuit means said second signal and said third signal during a first mode of operation, and mode-switching means for feeding into said subtracting circuit means said second signal and said fourth signal during a second mode of operation; control means connected to said computer for setting in predetermined constants for the particular aircraft being tracked; and GO—NO GO indicating means connected to the output of said computer to indicate whether safe take-off will be achieved.

3. Apparatus in accordance with claim 2 wherein said mode-switching means is an electronic switch responsive to a predetermined value of present position to switch operation from said first mode to said second mode.

4. A take-off monitor system comprising a ground-based radar adapted to track an aircraft during its take-off ground roll; atmospheric measuring instruments; control means for producing predetermined constants for the particular aircraft being tracked; a computer having means for accepting output signals from said radar, said instruments, and said control means, and having operating means to produce from its inputs an output signal continuously proportional to the quantity $$\text{T.O.C.} = \frac{V_{pg}^2 - (V_{fT} - V_W)^2}{2a_p + A[V_{fT}^2 - (V_{pg} + V_W)^2]} + (S_r - S_p)$$

where $V_{pg}$ = aircraft present ground speed,
$V_{ft}$ = aircraft true take-off airspeed,
$V_W$ = wind velocity in runway direction,
$a_p$ = aircraft present acceleration,
$A$ = constant, corresponding to aircraft type,
$S_r$ = total runway length, and
$S_p$ = aircraft present position;

and GO—NO GO indicating means connected to the output of said operating means for indicating respectively the positive or negative sign of said quantity.

5. A take-off monitor system comprising a ground-based Doppler radar adapted to track an aircraft during its take-off ground roll and having an output signal proportional in frequency to ground speed of the aircraft; atmospheric measuring instruments; a velocity tracker connected to the output of said radar and including a servomotor, means responsive to the output signal of said radar to drive said servomotor to a null position representing present ground speed of the aircraft, and means connected to said servomotor for measuring the speed thereof to thus provide a signal representing present acceleration of the aircraft; a computer connected to the outputs of said velocity tracker and said instruments, said computer producing an output signal representing take-off capability; input control means connected to said computer for setting in predetermined constants for the particular aircraft being tracked; and GO—NO GO indicating means connected to the output of said computer to indicate whether safe take-off will be achieved.

6. A take-off monitor system comprising a ground-based Doppler radar adapted to track an aircraft during its take-off ground roll and having an output signal proportional to ground speed of the aircraft being tracked; atmospheric measuring instruments; a velocity tracker connected to the output of said radar and comprising a variable frequency oscillator with a control member, means for mixing the output of said oscillator with said Doppler radar output signal, a fixed-tuned narrow bandwidth amplifier connected to the output of said mixing means, limiter and discriminator means connected to the output of said amplifier, a servomotor, means connecting said discriminator to said servomotor, means connecting said servomotor to said control member of said variable frequency oscillator in the proper direction to null the output of said discriminator, transducer means converting the position of said control member to a signal representing aircraft ground speed, and second transducer means converting the velocity of said servomotor to a signal representing aircraft acceleration; a computer connected to the outputs of said velocity tracker and said instruments; control means connected to said computer for setting in predetermined constants for the particular aircraft being tracked; and GO—NO GO indicating means connected to the output of said computer to indicate whether safe take-off will be achieved.

7. Apparatus in accordance with claim 6 wherein said narrow band amplifier has a bandwidth corresponding to only a few knots of aircraft ground speed, wherein said connecting means between said discriminator and said servomotor has an initial bias means positioning said servomotor at a standby position representing a predetermined minimum aircraft ground speed for tracking, and means for automatically switching from standby to normal tracking operation when an aircraft to be tracked reaches said predetermined speed, and including runway switch means adapted to be actuated by the aircraft at a predetermined point beyond where it will have reached said predetermined speed, said runway switch means being operatively connected in said computer to initiate computing when actuated.

8. A take-off monitor system comprising a ground-based radar adapted to track an aircraft during its take-off ground roll, atmospheric measuring instruments, a computer connected to the outputs of said radar and said instruments, control means connected to said computer for setting in predetermined constants for the particular aircraft being tracked, and GO—NO GO indicating means connected to the output of said computer to indicate whether safe take-off will be achieved, said control means comprising aircraft weight selection means with a calibrated selector member and electrical supply means for manually setting into said computer an electrical signal representing the aircraft gross weight, and an aircraft type selection matrix of electrical components having electrical supply means and selection indicia for manually setting into said computer an electrical signal representing the aircraft type.

9. A take-off monitor system comprising a ground-based radar adapted to track an aircraft during its take-off ground roll, atmospheric measuring instruments, a computer connected to the outputs of said radar and said instruments, control means connected to said computer for setting in predetermined constants for the particular aircraft being tracked, and GO—NO GO indicating means connected to the output of said computer to indicate whether safe take-off will be achieved, said indicating means comprising a series of green and red lights spaced along the runway within sight of the pilot of the aircraft being monitored, polarity-sensitive means responsive to the output signal of said computer for energizing said green lights if the output of said computer is of one polarity, and similar means for energizing said red lights if the output polarity is opposite.

10. Apparatus in accordance with claim 9 including signal detector means having its input connected into said computer, and flasher actuating means connected to said detector means for automatically flashing said green lights off and on when the aircraft reaches its prescribed take-off airspeed.

11. A take-off monitor system comprising a ground-based radar adapted to track an aircraft during its take-off ground roll; atmospheric measuring instruments; a computer connected to the outputs of said radar and said instruments; control means connected to said computer for setting in predetermined constants for the particular aircraft being tracked, including means producing a signal representing a normal acceleration value for the aircraft which signal is connectable into said computer, and circuit means in said computer where an initial signal representing total ground roll distance required for take-off is present; GO—NO GO indicating means normally connected to the output of said computer to indicate continuously during the ground roll whether safe take-off will be achieved; visual distance indicating means; and preflight selection switching means for switching said normal acceleration signal into said computer and switching said total ground roll signal out of said computer to said visual distance indicating means, whereby the normal required take-off distance can be checked just prior to starting the take-off run.

12. In an aircraft take-off monitor system, means producing a signal proportional to aircraft present ground speed, means producing a signal proportional to aircraft true take-off airspeed, means producing a signal proportional to wind velocity in runway direction, means producing a signal proportional to aircraft present acceleration, means producing a constant signal corresponding to aircraft type, means producing a constant signal corresponding to total runway length, means producing a signal proportional to aircraft present position, and a computer comprising means responsive to said signals for continuously evaluating the equation $$\text{T.O.C.} = \frac{V_{pg}^2 - (V_{fT} - V_W)^2}{2a_p + A[V_{fT}^2 - (V_{pg} + V_W)^2]} + (S_r - S_p)$$

where
$V_{pg}$ = aircraft present ground speed,
$V_{fT}$ = aircraft true take-off airspeed,
$V_W$ = wind velocity in runway direction,
$a_p$ = aircraft present acceleration,
$A$ = constant, corresponding to aircraft type,
$S_r$ = total runway length, and
$S_p$ = aircraft present position.

13. The method of evaluating the take-off capability of an aircraft during its take-off ground roll, comprising: producing a first signal proportional to the present position of the aircraft on the runway, producing a second signal proportional to the additional runway distance required to reach take-off speed, producing a third signal proportional to the remaining runway length available, subtracting said second signal from said third signal, producing a GO response when the result of said subtraction is positive, and producing a NO GO response when the result of said subtraction is negative.

14. In a monitor system for evaluating the take-off capability of an aircraft, means producing a first signal proportional to the present position of the aircraft on the runway, means producing a second signal proportional to the additional runway distance required to reach take-off speed, means producing a third signal proportional to the remaining runway length available, means subtracting said second signal from said third signal, and means responsive to said subtracting means having a favorable output indication when the result is positive and an unfavorable indication when the result is negative.

15. In a monitor system for evaluating the take-off capability of an aircraft, means producing a first signal proportional to the present position of the aircraft on the runway, means producing a second signal proportional to the additional distance required to reach take-off speed based on present aircraft performance, means producing a third signal proportional to the remaining distance to the normal take-off point of the aircraft, means producing a fourth signal proportional to the remaining runway length available, means subtracting said second signal from said third signal during a first mode of operation, means subtracting said second signal from said fourth signal during a second mode of operation, mode-switching means responsive to a predetermined value of said first signal to switch operation from said first mode to said second mode, and means responsive to said subtracting means to give a favorable indication when the result is positive and an unfavorable indication when the result is negative.

References Cited in the file of this patent

UNITED STATES PATENTS

| | | |
|---|---|---|
| 2,454,673 | Sanders | Nov. 23, 1948 |
| 2,555,101 | Alvarez | May 29, 1951 |
| 2,774,064 | O'Neil | Dec. 11, 1956 |
| 2,907,022 | Kendall | Sept. 29, 1959 |